2,803,674
ARALKYL HALIDE STABILIZERS

Charles A. Heiberger, Nitro, W. Va., and Phil K. Reily, Jr., Kensington, Md., assignors to Food Machinery and Chemical Corporation, New York, N. Y., a corporation of Delaware No Drawing. Application December 31, 1953, Serial No. 401,730

14 Claims. (Cl. 260—651)

This invention relates to the stabilization of aralkyl halides of the general formula $ArCH_2Hl$, where Ar represents any substituted or unsubstituted aromatic radical, and Hl represents halogen.

More particularly, this invention relates to the stabilization of aralkyl chlorides, especially where Ar is a substituted or unsubstituted phenyl or naphthyl radical.

These aralkyl halides are characterized to a varying degree with the property of instability during preparation, purification and storage, due to the deleterious effects of heavy metal contamination, heat and radiation. Heavy metal contamination appears to be the principal cause of instability, and may be due to the presence of the heavy metals themselves, such as iron, nickel, copper, lead, and zinc, or to the presence of salts of such metals, or other compounds thereof.

The degree of instability of aralkyl halides varies considerably, depending upon such factors as their particular chemical identity, degree of initial purity, the nature of the container, and the conditions which have obtained during the processing, purification and storage. This lack of stability is a very serious problem, and has been the object of considerable research directed toward obtaining a suitable remedy, since large losses of the compounds are caused, and frequently damage to the containers and place of storage results. Among these compounds, the chlorides in particular tend to decompose under normally encountered storage conditions, and are not considered safe for transporting as industrial chemicals in iron drums.

The instability problem of this class of compounds is not to be confused with the instability problem encountered in the alkyl halide class, well-exemplified by carbon tetrachloride, where the instability is largely a function of contamination by moisture. To correct that type of instability, dehydrating agents have been utilized, especially anhydrous salts which are capable of taking up water to form stable hydrates, in much the same way that anhydrous calcium sulfate or plaster of Paris take up water to form the stable hydrate gypsum. In contrast, in the present instability problem the presence or absence of water is immaterial. In fact, one of the prior art methods of stabilizing benzyl chloride, an important member of the present class, is the addition of an aqueous sodium carbonate solution to the container of benzyl chloride.

The inherent instability of this class of compounds normally leads to the decomposition of the aralkyl halide, with the formation of halogen acid, and a polymerization of the remainder of the molecule. During preparation and purification of these compounds this decomposition causes serious losses in yield. During storage in metal containers, the hydrogen halide liberated attacks the container metal and this autocatalyzes the decomposition at an increasing rate.

It is accordingly a principal object of this invention to provide novel stabilizers for aralkyl halides.

Another important object of this invention is to provide novel stabilized compositions comprising an aralkyl halide and a suitable stabilizer.

Another object of the invention is to provide a method for stabilizing aralkyl halides during preparation, purification, storage and use.

Other objects of the invention will be apparent to those skilled in the art from a consideration of the disclosure herein.

It has been discovered that aralkyl halides may be stabilized by the addition of a member of a particular class of acids, or acid salts thereof, which acid salts contain no heavy metal constituent element, since the presence of heavy metal would naturally defeat the purpose of stabilizing against heavy metal contamination.

The preferred acids, and acid salts thereof, are sulfuric and phosphoric; although acid phthalate salts have likewise proven effective, and phthalic acid to a lesser extent in accelerated tests. The preferred acid salts are those containing ammonium or alkali metal ions, such as sodium acid sulfate, potassium monohydrogen phosphate and ammonium dihydrogen phosphate.

The salt may be added in the form of a hydrate, an anhydrous compound, or as an aqueous solution, for as indicated above the presence or absence of water is largely immaterial, since it appears to have no deleterious effect upon the stability of this class of compounds.

No satisfactory theory for the stabilizing effect of this class of compounds has been evolved, although several theories have been considered unsatisfactory as an explanation. There may be an effect somewhat similar to the mass action in aqueous solutions, as exemplified by the suppression of the ionization of a weak acid in the presence of a salt of the acid.

The acid sulfates are preferred over sulfuric acid, since the sulfuric acid tends to cause carbonization under high temperature conditions. Also, sulfuric acid is objectionable to handle and may pose a separate corrosion problem. The acid salts are generally preferred over the respective acids because they are more convenient to handle and of course much less corrosive.

The amount of stabilizer required depends upon a number of various factors, as indicated above, but effective stabilization is observed under some conditions when as little as 0.1% of stabilizer is added. Under more adverse conditions, such as higher temperatures and/or excessive contamination, it may be necessary to add several percent of the stabilizer. Larger quantities are seldom necessary or desirable, and in most cases less than 5% of the stabilizer protects the aralkyl halide against decomposition under the most severe conditions normally encountered.

The invention will be better understood by a consideration of some examples typical of its application. Some of the tests were conducted under storage conditions which would normally be met in transit and warehouses. Other tests were devised to evaluate the stabilizers under accelerated storage conditions and under conditions encountered during preparation, purification and use of the aralkyl halides. In these accelerated tests, it was desirable to conduct the tests in glass equipment and add heavy metal contamination in the form of a heavy metal, a heavy metal compound or a water solution of the compound.

The examination of the test products included determinations of acidity, visual examination as to such factors as viscosity and color, and vacuum distillation to determine the percent of aralkyl halide recoverable. Treatment conditions were varied of excessive gas evolution, foaming or thickening occurred. In some cases, distillation was stopped if hydrogen halide evolution became pronounced.

Example 1

In a series of tests on stabilizing commercial methyl benzyl chloride, a standard amount of the compound was subjected to heating at 150° C. for thirty minutes, in the presence of 0.2% by weight of nickel chloride as a source of heavy metal contamination. One run was made without any added stabilizer whatever, and other runs were made using various stabilizers of the class of the instant invention, in the amount of 0.74 mole percent. The results are tabulated below.

| Stabilizer | Percent Recovery of Aralkyl Chloride | Acidity (Percent as HCl) |
|---|---|---|
| None | 72.4 | 0.016 |
| $NH_4HSO_4$ | 95.9 | 0.019 |
| $NH_4H_2PO_4$ | 100.0 | 0.016 |
| $(NH_4)_2HPO_4$ | 99.7 | 0.008 |
| $KHSO_4$ | 96.4 | 0.013 |
| $KH_2PO_4$ | 99.6 | 0.007 |

Example 2

Another series of accelerated tests were made the same as Example 1, except that the time of heating was extended to one hour, with the following results.

| Stabilizer | Percent Recovery of Aralkyl Chloride | Acidity (Percent as HCl) |
|---|---|---|
| None | 52.8 | 0.024 |
| $Na_2CO_3$ | 75.7 | 0.026 |
| $K_2HPO_4$ | 99.4 | 0.016 |
| $H_3PO_4$ (85%) | 100 | 0.005 |
| $NaH_2PO_4 \cdot H_2O$ | 100 | 0.005 |
| $H_2SO_4$ (95%) | 93.5 | 0.060 |
| $NaHSO_4$ | 99 | 0.050 |
| $Ph(CO_2)_2HK$ | 98 | 0.090 |
| $Ph(COOH)_2$ | 88 | 0.38 |

Sodium carbonate is a prior art stabilizer, and it is clear that it is relatively ineffective in comparison with a member of the class of the instant invention.

Example 3

Another series of accelerated tests was run similar to the foregoing series, except that the heating time was twenty minutes at 160° C., with the following results.

| Stabilizer | Percent Recovery of Aralkyl Chloride | Acidity (Percent as HCl) |
|---|---|---|
| None | 72 | 0.007 |
| $H_2SO_4$ | 88 | 0.680 |

Example 4

In a test similar to the foregoing, except that the heating was for one hour at 175° C., sodium hydrogen sulfate was compared with sodium carbonate, a prior art stabilizer. The sodium carbonate test resulted in polymerization within one half hour, after which heating was discontinued. The sample stabilized with sodium hydrogen sulfate developed an acidity of only 0.14%, and a recovery of 99.5% of the aralkyl chloride was made.

This invention is applicable to unstable aralkyl halides in general, but the invention is of greatest importance in the stabilization of the aralkyl chloride compounds most commonly used in commerce, such as benzyl chloride, methyl benzyl chloride, dimethyl benzyl chloride, ethyl benzyl chloride, diethyl benzyl chloride and various naphthobenzyl chlorides.

From a consideration of the foregoing discovery and applications thereof, it will be obvious to those skilled in the art that this invention may be utilized by means of minor variations, all of which are intended to fall within the spirit and scope of the appended claims.

This application is a continuation-in-part of our co-pending application, filed May 9, 1951, Serial No. 225,462, now abandoned.

That which is claimed as new is:

1. A stabilized aralkyl halide composition, comprising: an aralkyl halide and an effective stabilizing proportion of a compound selected from the group consisting of phosphoric acid, sulfuric acid, phthalic acid, and acid salts of the foregoing acids with ammonium and alkali metal ions.

2. The composition of claim 1, wherein the halogen of the aralkyl halide is chlorine.

3. The composition of claim 2, wherein the aralkyl chloride has the generic formula $ArCH_2Cl$, the Ar group being selected from the group consisting of substituted and unsubstituted phenyl and naphthyl radicals.

4. The composition of claim 1, wherein the aralkyl halide is benzyl chloride.

5. The composition of claim 1, wherein the aralkyl halide is methyl benzyl chloride.

6. The composition of claim 1, wherein the aralkyl halide is dimethyl benzyl chloride.

7. The composition of claim 1, wherein the aralkyl halide is ethyl benzyl chloride.

8. The composition of claim 1, wherein the aralkyl halide is naphthobenzyl chloride.

9. The method of stabilizing aralkyl halides against the deleterious effects of heavy metal contamination, heat and radiation, comprising: adding to said aralkyl halide an effective stabilizing proportion of a compound selected from the group consisting of phosphoric acid, sulfuric acid, phthalic acid, and acid salts of the foregoing acids with ammonium and alkali metal ions.

10. The process of claim 9, wherein the compound is an acid sulfate salt.

11. The process of claim 9, wherein the compound is an acid phosphate salt.

12. The process of claim 9, wherein the compound is phosphoric acid.

13. The process of claim 9, wherein the compound is a sodium salt.

14. The process of claim 9, wherein the compound is an ammonium salt.

References Cited in the file of this patent

UNITED STATES PATENTS

| 2,542,216 | Somogyi | Feb. 20, 1951 |

FOREIGN PATENTS

| 649,934 | France | Sept. 10, 1928 |
| 35,060 | France | June 18, 1929 |